United States Patent
Seo et al.

(10) Patent No.: US 9,294,311 B2
(45) Date of Patent: Mar. 22, 2016

(54) METHOD OF PERFORMING RESOURCE SPECIFIC CHANNEL ESTIMATION IN HETEROGENEOUS NETWORK SYSTEM AND APPARATUS THEREOF

(75) Inventors: Inkwon Seo, Anyang-si (KR); Hanbyul Seo, Anyang-si (KR); Byounghoon Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 426 days.

(21) Appl. No.: 13/824,229

(22) PCT Filed: Oct. 12, 2011

(86) PCT No.: PCT/KR2011/007569
§ 371 (c)(1),
(2), (4) Date: Mar. 15, 2013

(87) PCT Pub. No.: WO2012/057463
PCT Pub. Date: May 3, 2012

(65) Prior Publication Data
US 2013/0176933 A1    Jul. 11, 2013

Related U.S. Application Data

(60) Provisional application No. 61/407,439, filed on Oct. 27, 2011, provisional application No. 61/419,223, filed on Dec. 2, 2010.

(51) Int. Cl.
*H04L 25/02* (2006.01)
*H04W 36/02* (2009.01)
*H04J 11/00* (2006.01)
*H04L 5/00* (2006.01)

(52) U.S. Cl.
CPC ......... *H04L 25/0208* (2013.01); *H04J 11/0056* (2013.01); *H04L 25/0204* (2013.01); *H04L 25/0224* (2013.01); *H04W 36/026* (2013.01); *H04L 5/0048* (2013.01)

(58) Field of Classification Search
None
See application file for complete search history.

(56) References Cited

FOREIGN PATENT DOCUMENTS

| KR | 1020080084440 | 9/2008 |
|---|---|---|
| KR | 1020090115229 | 11/2009 |
| KR | 1020100039947 | 4/2010 |
| WO | 2009132531 | 11/2009 |

OTHER PUBLICATIONS

PCT International Application No. PCT/KR2011/007569, Notification of Transmittal of the International Search Report and the Written Opinion of the International Searching Authority, or Declaration dated May 1, 2012, 8 pages.

*Primary Examiner* — Huy D Vu
*Assistant Examiner* — Teisha D Hall
(74) *Attorney, Agent, or Firm* — Lee, Hong, Degerman, Kang & Waimey

(57) ABSTRACT

A method for performing resource specific channel estimation at a user equipment in a wireless communication system is disclosed. The method includes receiving one or more reference signals in a specific subframe from a serving cell, and performing channel estimation for a control region of a corresponding downlink subframe, based on the one or more reference signals. The channel estimation for the control region is performed based on one or more reference signals included in a data region of the corresponding downlink subframe.

14 Claims, 14 Drawing Sheets

FIG. 2
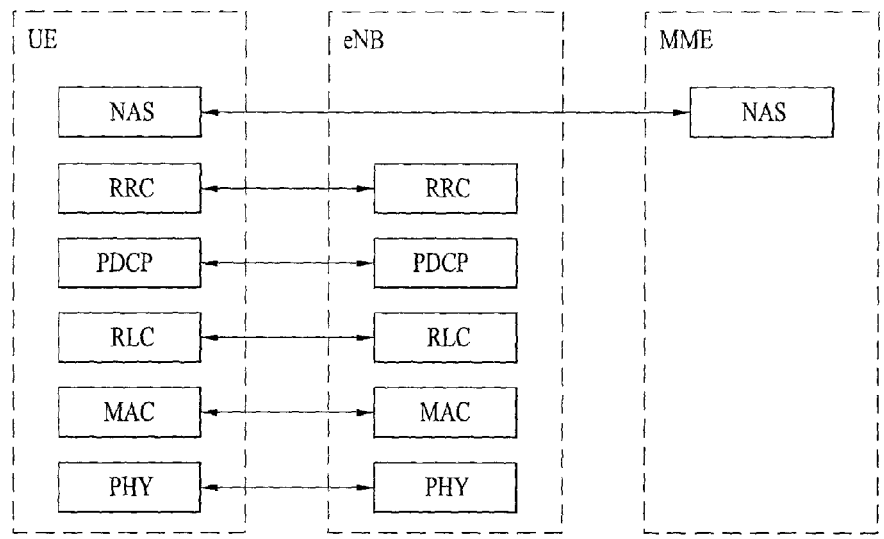
(a) CONTROL-PLANE PROTOCOL STACK
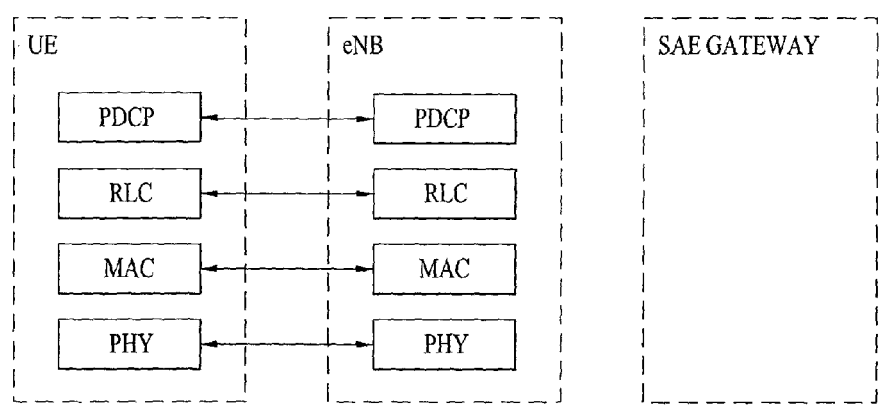
(b) USER-PLANE PROTOCOL STACK

METHOD OF PERFORMING RESOURCE SPECIFIC CHANNEL ESTIMATION IN HETEROGENEOUS NETWORK SYSTEM AND APPARATUS THEREOF

CROSS-REFERENCE TO RELATED APPLICATIONS

This application is the National Stage filing under 35 U.S.C. 371 of International Application No. PCT/KR2011/007569, filed on Oct. 12, 2011, which claims the benefit of U.S. Provisional Application Ser. No. 61/407,439, filed on Oct. 27, 2010, and U.S. Provisional Application Ser. No. 61/419,223, filed on Dec. 2, 2010, the contents of which are all hereby incorporated by reference herein in their entirety.

TECHNICAL FIELD

The present invention relates to a wireless communication system, and more particularly, to a method for performing resource specific channel estimation in a heterogeneous network system, and an apparatus thereof.

BACKGROUND ART

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new technical evolution is required to secure future competitiveness. For example, decrease of cost per bit, increase of service availability, flexible use of a frequency band, simple structure, open interface, and suitable power consumption by a UE are required.

DISCLOSURE

Technical Problem

An object of the present invention devised to solve the problem lies in a method and apparatus for performing resource specific channel estimation in a heterogeneous network system.

Technical Solution

The object of the present invention can be achieved by providing a method for performing resource specific channel estimation at a user equipment in a wireless communication system, including receiving one or more RSs in a specific subframe from a serving cell, and performing channel estimation for a control region of a corresponding downlink subframe, based on the one or more RSs, wherein the channel estimation for the control region is performed based on one or more reference signals included in a data region of the corresponding downlink subframe.

The method may further includes receiving resource specific channel estimation related information from the serving cell which is an interfered cell, wherein resource specific channel estimation related information includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed.

A reference signal transmitted through a control region of a downlink subframe corresponding to the serving cell which is an interfered cell and a reference signal transmitted through a control region of a downlink subframe corresponding to an interfering cell may be mapped to the same resource element. A difference between a cell ID of the serving cell which is an interfered cell and a cell ID of an interfering cell may be a multiple of 3.

A downlink subframe corresponding to an interfering cell may be configured such that only a cell-specific reference signal allocated to a control region is transmitted.

The serving cell which is an interfered cell may be a picocell and an interfering cell may be a macrocell. The method may further includes, if the user equipment connected to the macrocell is located in a range expansion region, receiving a handover message to the picocell from the macro cell, and accessing the picocell based on the handover message, wherein the handover message includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed. The information about the ABS and information about whether MBSFN configuration may be applied to the ABS are transmitted to the picocell from the macrocell through an x2 interface.

In another aspect of the present invention, provided herein is a user equipment apparatus for performing resource specific channel estimation in a wireless communication system, including a reception module for receiving one or more reference signals in a specific subframe from a serving cell, and a processor for performing channel estimation for a control region of a corresponding downlink subframe, based on the one or more reference signals, wherein the channel estimation for the control region is performed based on one or more reference signals included in a data region of the corresponding downlink subframe.

The serving cell which is an interfered cell may be a picocell and an interfering cell may be a macrocell. If the user equipment apparatus connected to the macrocell is located in a range expansion region, the user equipment apparatus may receive a handover message to the picocell from the macrocell and accesses the picocell based on the handover message, and wherein the handover message includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed.

Advantageous Effects

According to the embodiments of the present invention, resource specific channel estimation can be effectively performed in a heterogeneous network system.

The effects which can be obtained from the present invention are not limited to the above-mentioned effects, and other effects not mentioned above can be clearly understood by one skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing structures of a control plane and a user plane of a radio interface protocol between a UE and an E-UTRAN based on the 3GPP radio access network specification;

MODE FOR INVENTION

Figure 1:
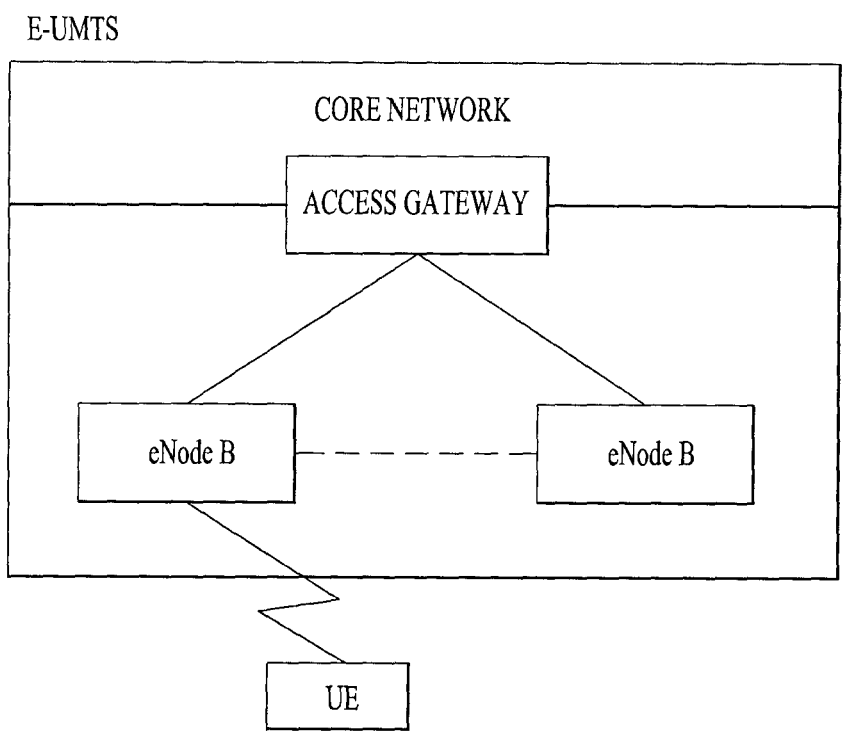
FIG. 1 is a diagram schematically showing a network structure of an E-UMTS as an exemplary radio communication system.

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-A system, the LTE system and the LTE-A system are only exemplary and the embodiments of the present invention can be applied to all communication systems corresponding to the aforementioned definition. Also, although the embodiments of the present invention will herein be described based on FDD mode, the FDD mode is only exemplary and the embodiments of the present invention can easily be applied to H-FDD mode or TDD mode.

FIG. 2 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
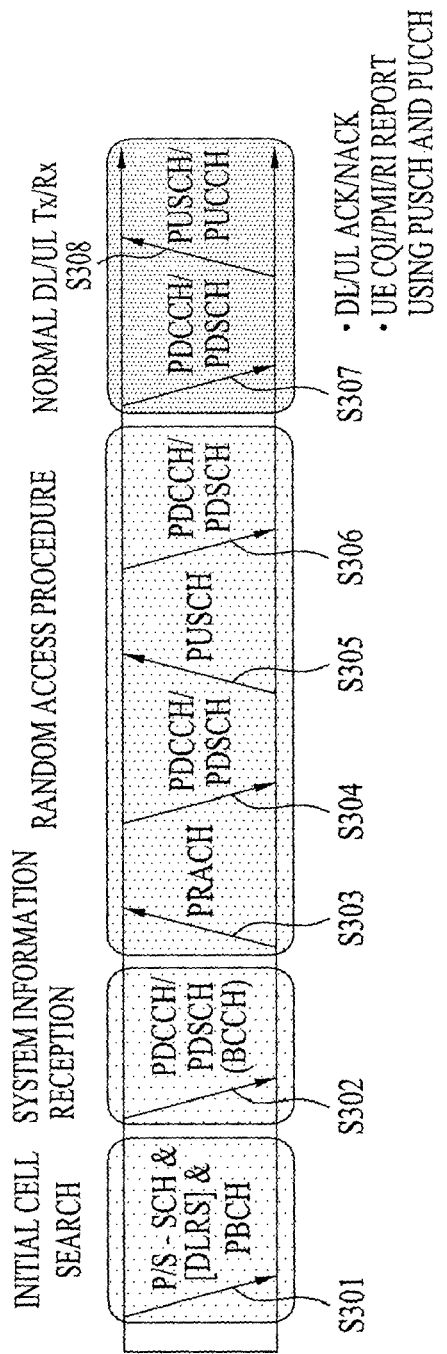
FIG. 3 is a diagram showing physical channels used in a 3GPP system and a general signal transmission method using the same.

FIG. 3 is a diagram showing physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDCCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
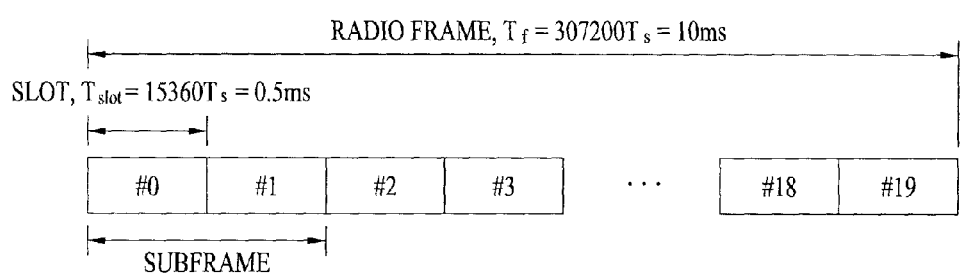
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 kHz \times 2048)=3.2552 \times 10^{-8}$ (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
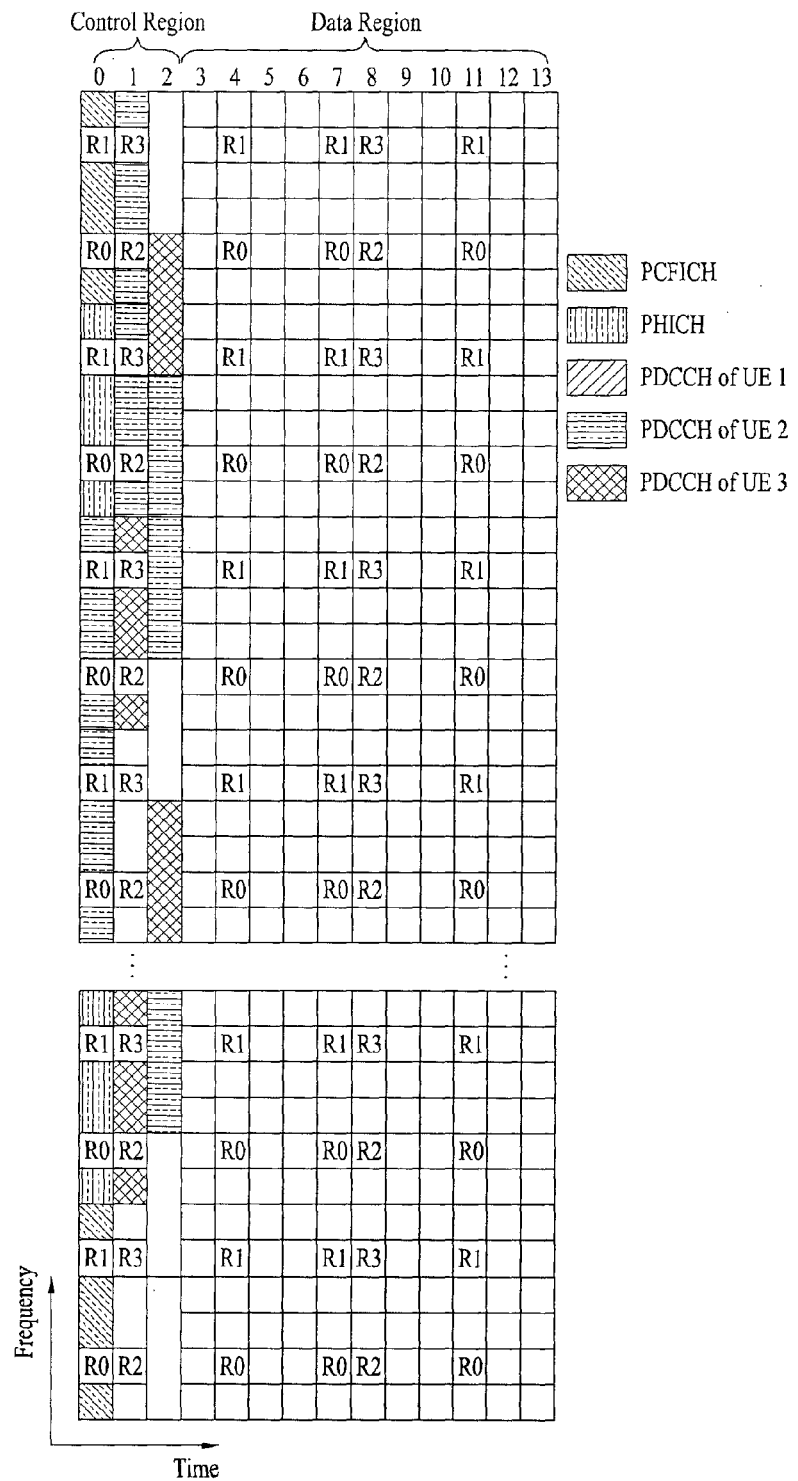
FIG. 5 is a diagram showing the structure of a downlink radio frame used in an LTE system.

FIG. 5 is a diagram showing a control channel contained in a control region of one subframe in a downlink radio frame.

Referring to FIG. 5, one subframe includes 14 OFDM symbols. First to third ones of the 14 OFDM symbols may be used as a control region and the remaining OFDM symbols (i.e., 13 to 11 OFDM symbols) may be used as a data region, according to subframe setting. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources, to which the RS is not allocated, in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain a diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A', and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Hereinafter, a MIMO system will be described. Multiple-Input Multiple-Output (MIMO) refers to a method of using multiple transmission antennas and multiple reception antennas to improve data transmission/reception efficiency. Namely, a plurality of antennas is used in a transmitting end or a receiving end of a wireless communication system so that capacity can be increased and performance can be improved. Hereinafter, MIMO may indicate multiple antennas in this document.

MIMO technology does not depend on a single antenna path in order to receive a single message. Instead, MIMO technology collects data fragments received via several antennas, merges the data fragments, and forms complete data. The use of MIMO technology can increase system coverage while improving data transmission rate within a cell area of a specific size or guaranteeing a specific data transmission rate. MIMO technology can be widely used in mobile communication terminals and relay nodes. MIMO technology can overcome the limitations of the restricted amount of transmission data of single antenna based mobile communication systems.

Figure 6:
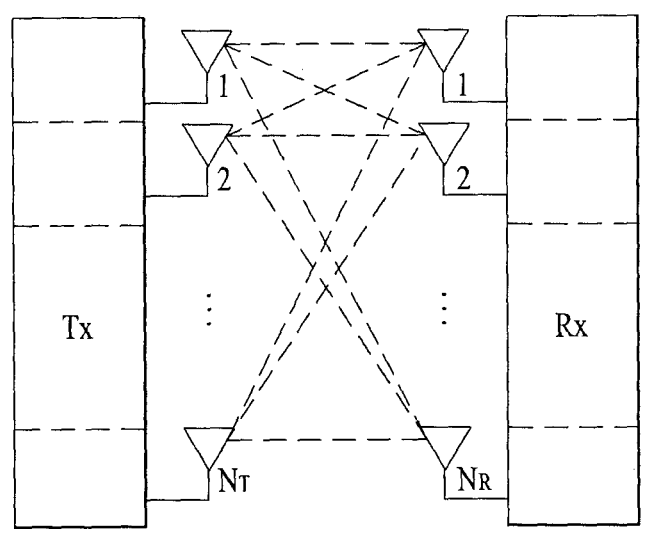
FIG. 6 is a diagram showing the configuration of a general MIMO communication system.

The configuration of a general MIMO communication system is shown in FIG. 6. A transmitting end is equipped with $N_T$ transmission antennas and a receiving end is equipped with $N_R$ reception antennas. If a plurality of antennas is used both in the transmitting end and in the receiving end, theoretical channel transmission capacity increases unlike the case where only either the transmitting end or the receiving end uses a plurality of antennas. Increase in channel transmission capacity is proportional to the number of antennas, thereby improving transmission rate and frequency efficiency. If a maximum transmission rate when using a signal antenna is $R_o$, a transmission rate when using multiple antennas can be theoretically increased by the product of the maximum transmission rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four transmission antennas and four reception antennas, it is possible to theoretically acquire a transmission rate four times that of a single antenna system. After an increase in the theoretical capacity of the MIMO system was first proved in the mid-1990s, various techniques for substantially improving data transmission rate have been under development. Several of these techniques have already been incorporated into a variety of wireless communication standards including, for example, $3^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel estimation and model derivation of MIMO systems, and research into space-time signal processing technologies for improving transmission reliability and transmission rate.

To describe a communication method in a MIMO system in detail, a mathematical model thereof is given below. As shown in FIG. 6, it is assumed that $N_T$ transmission antennas and $N_R$ reception antennas are present. In the case of a transmission signal, a maximum number of transmittable pieces of information is $N_T$ under the condition that $N_T$ transmission antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, using a diagonal matrix P of a transmission power, $\hat{s}$ can be represented by the following Equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A weight matrix W may be applied to the information vector $\hat{s}$ having adjusted transmission powers to configure $N_T$ transmission signals $x_1, x_2, \ldots x_{N_T}$ to be actually transmitted. In this case, the weight matrix is adapted to properly distribute transmission information to individual antennas according to transmission channel situations. The transmission signals $x_1, x_2, \ldots x_{N_T}$ can be represented by the following Equation 5 using a vector X, where $w_{ij}$ is a weight between the i-th transmission antenna and the j-th information, and W is a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{1N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Generally, the physical meaning of a rank of a channel matrix may be a maximum number of different transmittable information in a given channel. Accordingly, since the rank of the channel matrix is defined as the smaller of the number of rows or columns, which are independent of each other, the rank of the matrix is not greater than the number of rows or columns. A rank rank(H) of a channel matrix H is restricted as follows.

$$\text{rank}(H) \leq \min(N_T, N_R) \quad \text{[Equation 6]}$$

Define each of different information transmitted using MIMO technology as a 'transmission stream' or simply 'stream'. The 'stream' may be referred to as a 'layer'. Then the number of transmission streams is not greater than a rank of a channel which is a maximum number of different transmittable information. Accordingly, the channel matrix h may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream can be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid type of the spatial diversity and the spatial multiplexing.

Hereinafter, a Reference Signal (RS) will be described in detail. For channel estimation, an RS, of which both a transmitting side and a receiving side are aware, is generally transmitted from the transmitting side to the receiving side together with data. Such an RS functions to perform a demodulation process by informing the transmitting and receiving sides of a modulation scheme as well as channel estimation. The RS is divided into a Dedicated RS (DRS) for a BS and a specific UE, i.e. a UE-specific RS, and a Common RS (CRS) which is a cell-specific RS for all UEs within a cell. The cell-specific RS includes an RS for reporting CQI/PMI/RI measured by a UE to a BS and such RS is referred to as a Channel Station Information-RS (CSI-RS).

Figure 7:
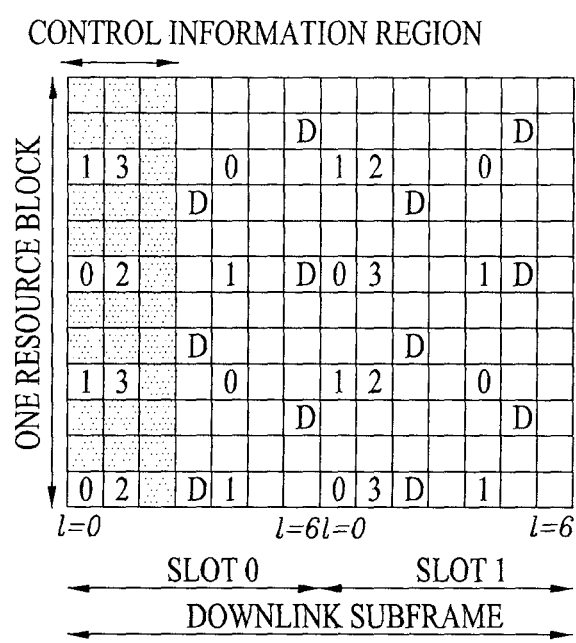
FIGS. 7 and 8 are diagrams showing the structure of a reference signal in an LTE system supporting downlink transmission using 4 antennas.
Figure 8:
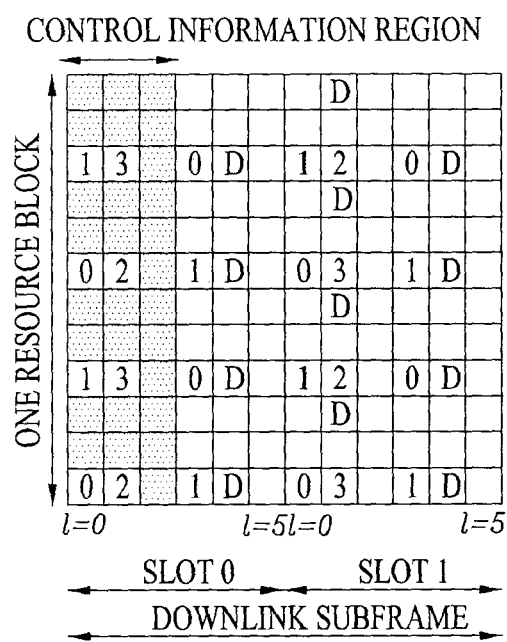

FIGS. 7 and 8 are diagrams showing the structure of an RS in an LTE system supporting downlink transmission using 4 antennas. Especially, FIG. 7 is for a normal Cyclic Prefix (CP) and FIG. 8 is for an extended CP.

Referring to FIGS. 7 and 8, '0' to '3' indicated in the lattice correspond to antenna ports 0 to 3, respectively, and denote CRSs which are cell-specific RSs transmitted for channel estimation and data demodulation. The CRSs, which are cell-specific RSs, may be transmitted to a UE through all control information regions as well as a data information region.

'D's indicated in the lattice denote downlink Demodulation-RSs (DM-RSs) which are UE-specific RSs. The DM-RSs supports single-antenna port transmission through a PDSCH. Whether DM-RSs, which are UE-specific RSs, are present is signaled to a UE through an upper layer. FIGS. 7 and 8 show DM-RSs corresponding to an antenna port 5. DM-RSs for antenna ports 7 to 14 are defined in 3GPP standard document 36.211.

Meanwhile, a mapping rule of an RS to a Resource B Block (RB) may be expressed by Equations 8 to 10. The following Equation 8 indicates a CRS mapping rule, Equation indicates a DRS mapping rule to which a normal CP is applied, and Equation 10 indicates a DRS mapping rule to which an extended CP is applied.

$$k = 6m + (v + v_{shift}) \mod 6 \quad \text{[Equation 8]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

$$k = (k') \mod N_{sc}^{RB} + N_{sc}^{RB} \cdot n_{PRB} \quad \text{[Equation 9]}$$

$$k' = \begin{cases} 4m' + v_{shift} & \text{if } l \in \{2, 3\} \\ 4m' + (2 + v_{shift}) \mod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \mod 2 = 0 \\ 2, 3 & \text{if } n_s \mod 2 = 1 \end{cases}$$

$$m' = 0, 1, \ldots, 3N_{RB}^{PDSCH} - 1$$

$$v_{shift} = N_{ID}^{cell} \mod 3$$

$$k = (k') \mod N_{sc}^{RB} + N_{sc}^{RB} \cdot n_{PRB} \quad \text{[Equation 10]}$$

$$k' = \begin{cases} 3m' + v_{shift} & \text{if } l = 4 \\ 3m' + (2 + v_{shift}) \mod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \mod 2 = 0 \\ 1, 2 & \text{if } n_s \mod 2 = 1 \end{cases}$$

$$m' = 0, 1, \ldots, 4N_{RB}^{PDSCH} - 1$$

$$v_{shift} = N_{ID}^{cell} \mod 3$$

In Equations 8 to 10, k and p denote a subcarrier index and an antenna port, respectively. $N_{RB}^{DL}$, $n_s$, and $N_{cell}^{ID}$ denote the number of RBs allocated to downlink, the number of slot indexes, and the number of cell IDs, respectively. The location of the RS in a frequency domain depends on a value $V_{shift}$.

Meanwhile, in an LTE-A system which is a standard of a future-generation mobile communication system, it is expected to support a Cooperative Multi-Point (CoMP) transmission scheme, which has not been supported in conventional standards, in order to improve data transmission rate. The CoMP transmission scheme refers to a transmission scheme in which two or more BSs or cells coordinately communicate with a UE to improve communication performance between a UE located in a shadow area and a BS (or cell or sector).

The CoMP transmission scheme may be divided into a Joint Processing (JP) scheme of a cooperative MIMO form through data sharing and a Coordinated Scheduling/Beamforming (CS/CB) scheme.

In the JP scheme in downlink, a UE may instantaneously and simultaneously receive data from BSs performing a CoMP transmission scheme and may combine signals received from the respective BSs, thereby improving reception performance. In the CoMP-CS/CB scheme, however, the UE may instantaneously receive data from one BS through beamforming.

In the JP scheme in uplink, respective BSs may simultaneously receive a PUSCH signal from a UE. In the CoMP-CS/CB scheme, however, only one BS receives the PUSCH signal. Whether to use the CoMP-CS/CB scheme is determined by coordinated cells (or BSs).

Meanwhile, when a channel state between a BS and a UE is poor, a relay node may be installed therebetween to provide a radio channel having a better channel state to the UE. In addition, a higher-rate data channel may be provided and a cell service area may be expanded by introducing the relay node in a cell boundary area in which a channel state from a BS is inferior. Thus, the relay node is widely used as a technique introduced to solve a propagation shadow zone in a radio communication system.

The past relay node technique was limited to the function of a repeater which simply amplifies signals and transmits the amplified signals, whereas the recent technique has developed into a more intelligent form. Furthermore, the relay node technique is indispensible in decreasing extension costs of a BS and maintenance costs of a backhaul network, and simultaneously in enlarging service coverage and improving data throughput in future mobile communication systems. As the relay node technique has gradually developed, it is necessary to support a relay node, which is used in a conventional radio communication system, through a new radio communication system.

In a 3GPP LTE-A system, two types of links having different attributes are applied to uplink and downlink carrier frequency bands while introducing a role of forwarding a link connection between a BS and a UE to the relay node. A connection link part established between links of a BS and a relay node is defined as a backhaul link. Transmission by an FDD or TDD scheme using downlink resources may be expressed as a backhaul downlink, and transmission by an FDD or TDD scheme using uplink resources may be expressed as a backhaul uplink.

Figure 9:
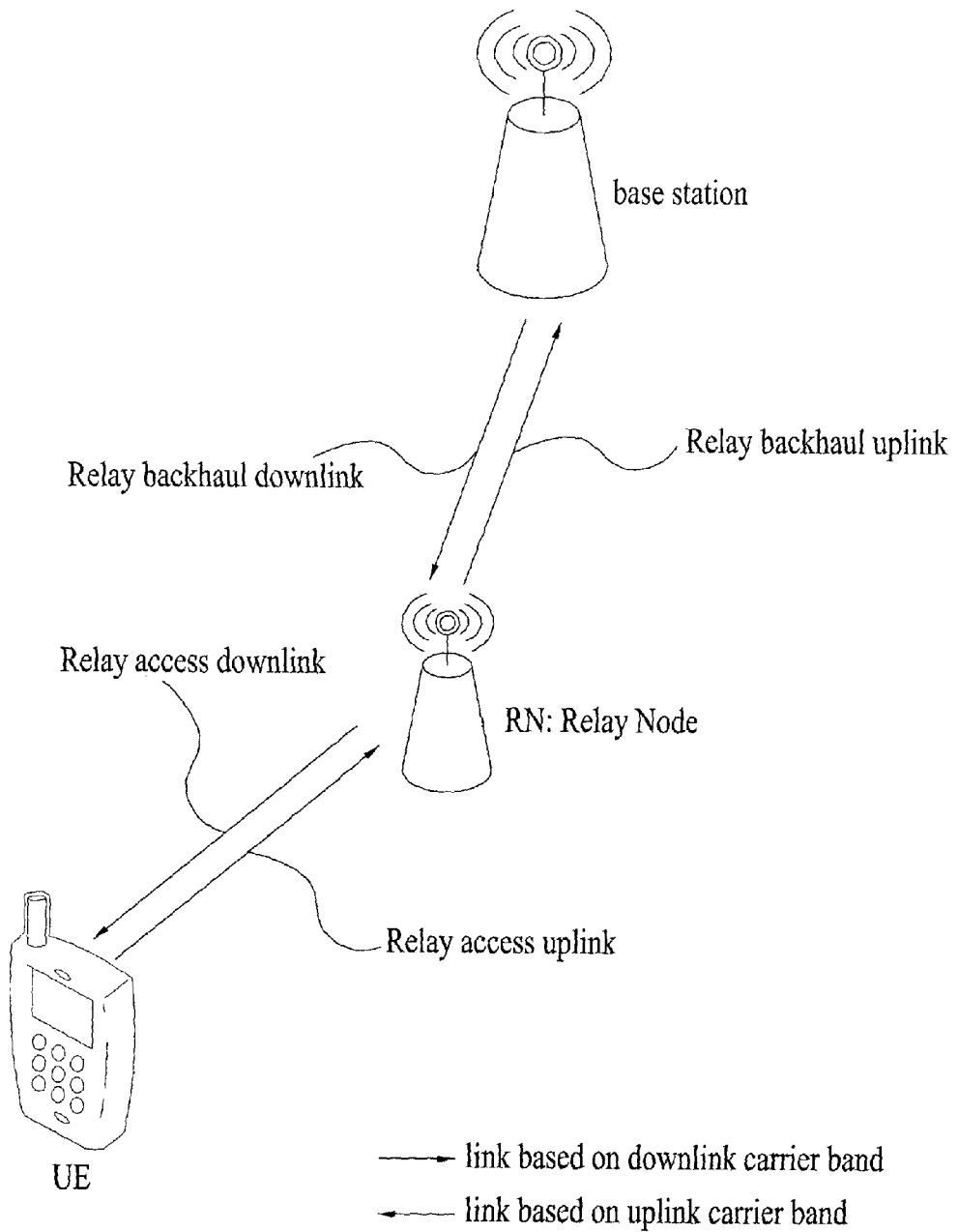
FIG. 9 is a diagram showing the configuration of relay backhaul links and relay access links in a wireless communication system.

FIG. 9 is a diagram showing the configuration of relay backhaul links and relay access links in a wireless communication system.

Referring to FIG. 9, two types of links having different attributes are applied to uplink and downlink carrier frequency bands while introducing a role of forwarding a link connection between a BS and a UE to the relay node. A connection link part established between links of a BS and a relay node is defined as a backhaul link. Transmission of the backhaul link using a downlink frequency band (in the case of FDD) or a downlink subframe (in the case of TDD) resource may be expressed as a backhaul downlink, and transmission of the backhaul link using an uplink frequency band (in the case of FDD) or an uplink subframe (in the case of TDD) resource may be expressed as a backhaul uplink.

Meanwhile, a connection link part established between a relay node and a series of UEs is defined as a relay access link. Transmission of the relay access link using a downlink frequency band (in the case of FDD) or a downlink subframe (in the case of TDD) resource may be expressed as an access downlink, and transmission of the relay access link using an uplink frequency band (in the case of FDD) or an uplink subframe (in the case of TDD) resource may be expressed as an access uplink.

A Relay Node (RN) may receive information from a BS through a relay backhaul downlink and may transmit information to the BS through a relay backhaul uplink. Further, the RN may transmit information to the UE through a relay access downlink and may receive information from the UE through a relay access uplink.

In relation to the use of a band (or spectrum) of the RN, the case where the backhaul link operates in the same frequency band as the access link is referred to as in-band, and the case where the backhaul link operates in different frequency bands from the access link is referred to as out-band. In both the in-band and the out-band, UEs operating according to a conventional LTE system (e.g., Release-8), which will be referred to as legacy UEs, should be able to access a donor cell.

The RN may be classified into a transparent RN and a non-transparent RN depending on whether or not a UE recognizes the TN. In the transparent RN, the UE is not aware that it is communicating with a network via the RN, and in the non-transparent RN, the UE is aware that it is communicating with the network via the RN.

In relation to control of the RN, the RN may be divided into an RN as part of a donor cell and an RN for controlling a cell by itself.

The RN as part of the donor cell may have an RN ID but does not have a cell ID thereof. If at least part of Radio Resource Management (RRM) is controlled by a BS to which the donor cell belongs (even if the other parts of the RRM are located in the RN), this may be called an RN as part of the donor cell. Desirably, such an RN may support legacy UEs. Smart repeaters, decode-and-forward relays, different types of L2 (second layer) RNs, and type-2 RNs are examples of this type of RN.

In the case where an RN is in control of a cell thereby, the RN controls one or several cells. A unique physical layer cell ID is provided to each of the cells controlled by the RN and the same RRM mechanism is available. In terms of the UE, there is no difference in accessing cells controlled by an RN and cells controlled by normal BSs. The cells controlled by the RN may support the legacy UEs. Self-backhauling RNs, L3 (third layer) RNs, type-1 RNs, and type-1a RNs are examples of this type of RN.

A type-1 RN is an in-band RN and controls a plurality of cells, each of which appears as a separate cell, distinct from a donor cell, in terms of a UE. The plurality of cells has respective physical cell IDs (defined in LTE Release-8) and the RN may transmit synchronization channels and reference signals thereof. In the case of single-cell operation, the UE may receive scheduling information and HARQ feedback directly from the RN and may transmit control channels (Scheduling Request (SR), CQI, ACK/NACK, etc.) thereof to the RN. The type-1 RN appears as a legacy BS (a BS operating according to LTE Release-8) to legacy UEs (UEs operating according to LTE Release-8). Namely, the type-1 RN has backward compatibility. Meanwhile, to UEs operating according to an LTE-A system, the type-1 RN appears as a BS different from the legacy BS to provide performance enhancement.

A type-1a RN has the same characteristics as the above-mentioned type-1 RN except that it operates in out-band. The operation of the type-1a RN may be configured to minimize an influence on the operation of an L1 (first layer) or to eliminate such influence.

A type-2 RN, which is an in-band RN, does not have a separate physical cell ID and thus does not create any new cells. The type-2 RN is transparent to the legacy UEs, and the legacy UEs are not aware of the presence of the type-2 RN. The type-2 RN may transmit a PDSCH but does not transmit a CRS and a PDCCH.

Meanwhile, in order to allow in-band operation of the RN, some resources in the time-frequency space should be reserved for the backhaul link and may be set not to be used for the access link. This is called resource partitioning.

A general principle for resource partitioning in the RN is as follows. The backhaul downlink and access downlink may be time division multiplexed in a single carrier frequency by a TDM scheme (namely, only one of the backhaul downlink and access downlink is activated at a specific time). Similarly, the backhaul uplink and access uplink may be time division multiplexed in a single carrier frequency by a TDM scheme (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes and uplink subframes of a BS and an RN, respectively.

In the case of an in-band RN, for example, if reception of the backhaul downlink from the BS and transmission of the access downlink to the UE are simultaneously performed in a predetermined frequency band, a signal transmitted from a transmitting end of the RN may be received at a receiving end of the RN and thus signal interference or Radio Frequency (RF) jamming may occur at an RF front end of the RN. Similarly, if reception of the access uplink from the UE and transmission of the backhaul uplink to the BS are simultaneously performed in a predetermined frequency band, signal interference may occur at the RF front end of the RN. Accordingly, in the RN, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

One method for solving the problem of signal interference is to allow the RN not to transmit a signal to a UE while receiving a signal from the donor cell. That is, the UE (including the legacy UE) may be set not to expect any transmission from the RN during a gap by generating the gap during transmission to the UE from the RN. Such a gap may be set by configuring a Multicast Broadcast Single Frequency Network (MBSFN) subframe.

Figure 10:
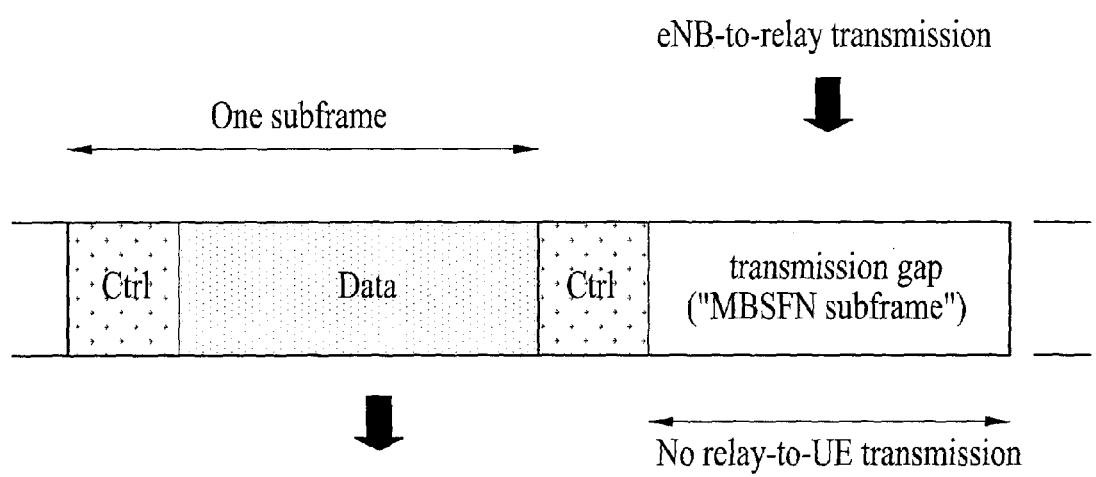
FIG. 10 is a diagram showing relay node resource partitioning.

FIG. 10 is a diagram showing RN resource partitioning.

In FIG. 10, a first subframe is a general subframe and, in the first subframe, downlink (i.e., access downlink) control signals and data are transmitted to a UE from an RN. A second subframe is an MBSFN subframe. Control signals are transmitted to the UE from the RN in a control region of a downlink subframe but no transmission is performed from the RN to the UE in the other regions of the downlink subframe. In this case, since legacy UEs expect transmission of a PDCCH in all downlink subframes (in other words, since the RN requires support for legacy UEs within its region to receive the PDCCH in every subframe and to perform a measurement function), it is necessary to transmit the PDCCH in all downlink subframes, for correct operation of the legacy UEs. Accordingly, even in a subframe established for downlink (i.e., backhaul downlink) transmission to an RN from a BS, the RN needs to perform access downlink transmission in the first N (where N=1, 2, or 3) OFDM symbol durations rather than to receive the backhaul downlink. With regard to this, since the PDCCH is transmitted to the UE from the RN in the control region of the second subframe, backward compatibility for the legacy UEs served by the RN may be provided. In the other regions of the second subframe, the RN may receive transmission from the BS while no transmission from the RN to the UE is performed. Through such a resource partitioning scheme, the access downlink transmission and the backhaul downlink reception in the in-band relay node may not be simultaneously performed.

The second subframe using the MBSFN is described in more detail. The control region of the second subframe may be called an RN non-hearing interval. During the RN non-hearing interval, the RN does not receive a backhaul downlink signal and transmits an access downlink signal. This interval may be set to a length of 1, 2, or 3 OFDM symbols as described above. In the RN non-hearing interval, the RN may carry out access downlink transmission to the UE, and in the other intervals, it may perform backhaul downlink reception from the BS. In this case, since the RN cannot perform simultaneous transmission and reception in the same frequency band, the RN consumes time to change from a transmission mode to a reception mode. Accordingly, a Guard Time (GT) is needed to switch the transmission/reception mode in the first partial interval of a backhaul downlink reception region. Similarly, the GT for switching the reception/transmission mode of the RN node may be set even when the RN performs backhaul downlink reception from the eNB and the access downlink transmission to the UE. The length of the GT may be given as a value of a time domain, for example, as k (where k≥1) time samples (Ts), or as a length of one or more OFDM symbols. Alternatively, if the RN backhaul downlink subframes are successively configured, or according to a timing alignment relationship of prescribed subframes, the GT of the last part of the subframe may not be defined or configured. The GT may be defined only in a frequency domain which is configured for transmission of the backhaul downlink subframe in order to maintain backward compatibility. (If the GT is configured in the access downlink interval, legacy UEs cannot be supported). In the backhaul downlink reception interval except for the GT, the RN may receive the PDCCH and PDSCH from the BS. This may be expressed as Relay-PDCCH (R-PDCCH) and Relay-PDSCH (R-PDSCH) indicating RN dedicated physical channels.

Hereinafter, a resource specific channel estimation method proposed in the present invention will be described. Resource specific channel estimation refers to performing channel estimation for all channel resources using only resources, a degree of interference of which is relatively low, when strong interference occurs in a part of resources used during channel estimation. Resources used for resource specific channel estimation of the present invention may consider the following regions.

1) In a downlink subframe, one of a control region, i.e. a symbol region in which a PDCCH is transmitted, and a data region, i.e. a symbol region in which a PDSCH is transmitted, may be specified as a resource used for resource specific channel estimation. In other words, channel estimation may be performed using an RS positioned in any one of a control region and a data region.

2) One of a first slot and a second slot in a downlink subframe may be specified as a resource used for resource specific channel estimation.

3) One or more specific symbols in a downlink subframe may be specified as a resource used for resource specific channel estimation.

As a specific embodiment to which a resource specific channel estimation method of the present invention is applicable, enhanced Inter-Cell Interference Coordination (eICIC) in a Heterogeneous Network (HetNet) system will be described hereinbelow. The HetNet may include a macrocell and picocell deployment and a macrocell and femtocell deployment. The eICIC refers to a method capable of relieving intercell interference which is greater than a reception signal from a serving cell when a picocell in a macrocell and picocell deployment or a macrocell in a macrocell and femtocell deployment is the serving cell.

A typical eICIC scheme, which is being discussed, is to reduce interference by allowing an interfering cell to designate one or more specific frames as Almost Blank Subframes (ABSs). The subframes designated as the ABSs may be configured such that the interfering cell transmits only a CRS, which is a cell-specific RS, in the subframes designated as the ABSs. In the subframes designated as the ABSs, a PBCH, SCH, or paging, having a predetermined period, may be transmitted in addition to the CRS. To further reduce intercell interference, a method for applying MBSFN configuration to the subframes designated as ABSs may be considered.

However, in the case of the CRS, since a reuse factor between cells is merely 3, if a plurality of femtocells or plurality of picocells is present within coverage of a macrocell, a possibility of CRS collision is very high.

Figure 11:
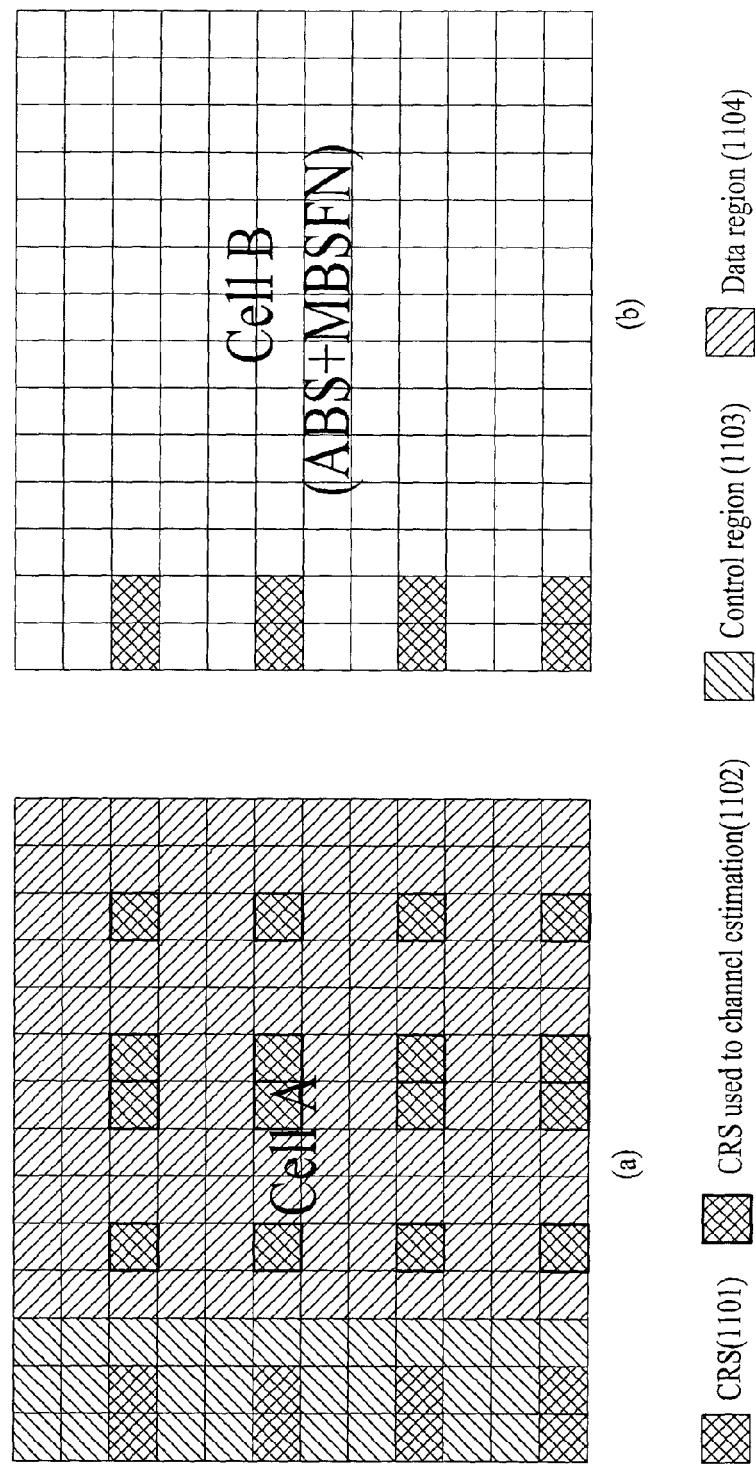
FIG. 11 is a diagram explaining a resource specific channel estimation scheme of the present invention.

FIG. 11 is a diagram explaining a resource specific channel estimation scheme of the present invention. Especially, (a) of FIG. 11 illustrates a subframe configuration of an interfered cell (cell A) and (b) of FIG. 11 illustrates a subframe configuration of an interfering cell (cell B). In FIG. 11, it is assumed for an eICIC scheme that a subframe allocated to the interfering cell (cell B) is an ABS subframe to which MBSFN configuration is applied, and the interfered cell (cell A) performs downlink transmission in a corresponding subframe.

Referring to FIG. 11, even if the interfering cell (cell B) designates a specific subframe as an ABS subframe, to which MBSFN configuration is applied, for the interfered cell (cell A), CRSs 1101 included in a control region 1103 of the cell A are directly subject to interference from CRSs of the cell B. Generally, although channel estimation for the control region 1103 can be performed using only the CRSs 1101 included in the control region 1103 in order to rapidly demodulate control information, if the CRSs 1101 included in the control region 1103 collide with CRSs of another cell as shown in FIG. 11, it is proposed to obtain more accurate channel information by performing channel estimation of the control region 1103 using CRSs 1102 of a data region 1104.

Specifically, to perform channel estimation of the control region 1103 using the CRSs 1102 of the data region 1104, a UE may perform channel estimation using only the CRSs 1102 of the data region 1104 after receiving not only the CRSs of the control region 110 but also the CRSs of the data region 1104 in order to demodulate control information.

In the present invention, a method for signaling a subframe, to which the resource specific channel estimation scheme is applied, to a UE is also proposed. A detailed description is given by way of example.

Figure 12:
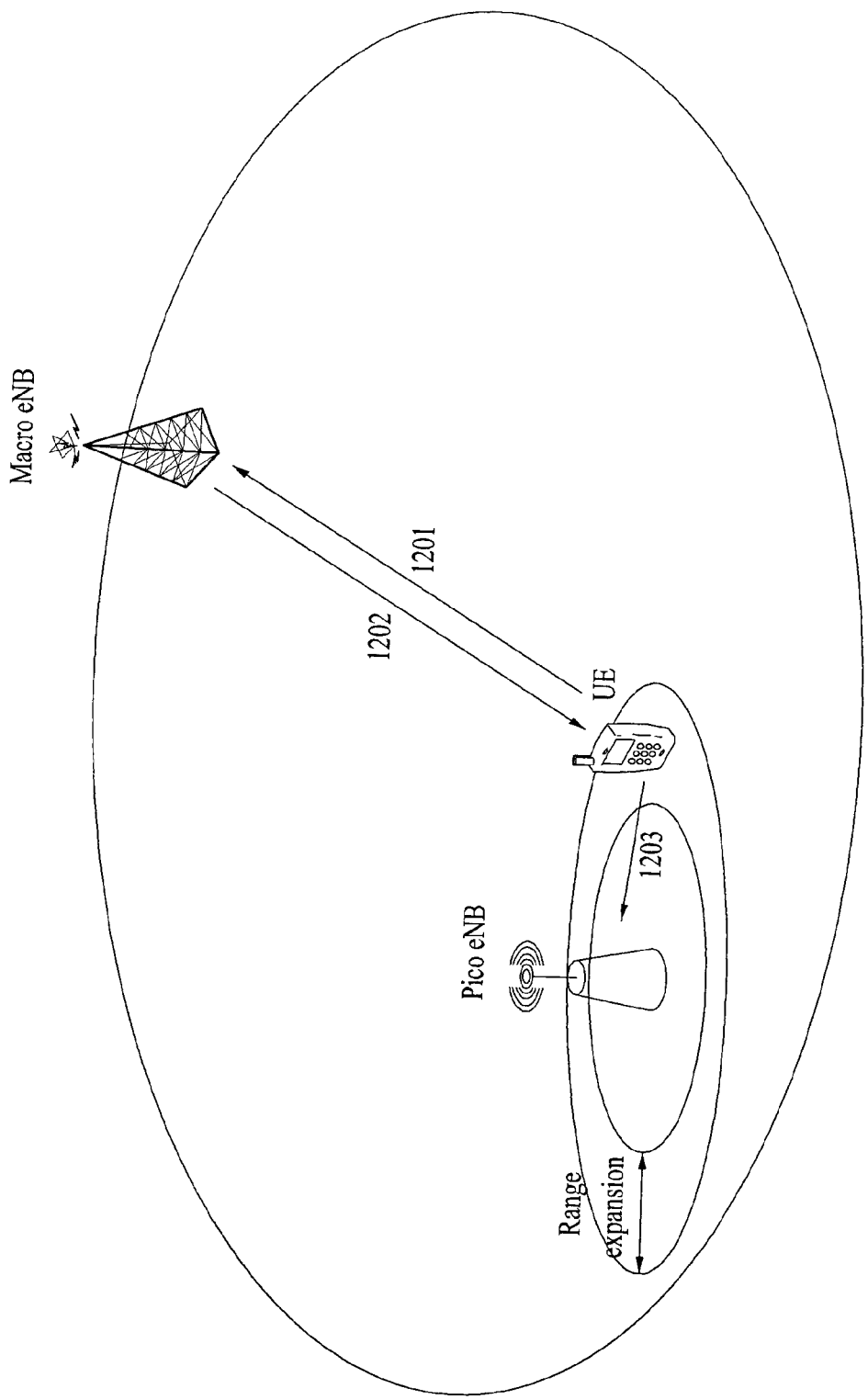
FIG. 12 is a diagram showing a heterogeneous network system to which a resource specific channel estimation scheme of the present invention is applicable.

FIG. 12 is a diagram showing a HetNet system to which the resource specific channel estimation scheme of the present invention is applicable. Especially, FIG. 12 shows a HetNet of a macrocell and picocell deployment to which an eICIC scheme is applied.

As described previously, a cell configuration considered as the case where an eICIC scheme is applied in an LTE-A system includes a macrocell and femtocell deployment, a macrocell and picocell deployment, etc. Especially, in the macrocell and picocell deployment, information may be exchanged through an x2 interface. In FIG. 12, it is assumed that a picoUE performs initial access within a range expansion region of a picocell.

Referring to FIG. 12, the range expansion of the picocell indicates the expansion of picocell coverage using transmission power offset etc. Especially, in FIG. 12, it is assumed that the picoUE is present in the range expansion region. Then a signal to the picoUE from an eNB of a picocell becomes weak and interference from a macrocell becomes strong. Namely, reception performance from the picocell is reduced due to interference from an eNB of the macrocell.

In this case, the picoUE accesses the eNB of the macrocell, as shown in step 1201, according to a channel estimation result. Next, to cope with the range expansion of the picocell, the picoUE receives a handover message from the eNB of the macrocell in step 1202 to access the picocell as indicated by step 1203. A scenario shown in FIG. 12 is similarly implemented even when a UE which has accessed the eNB of the macrocell enters the range expansion region of the picocell.

Accordingly, the present invention proposes signaling of information necessary for resource specific channel estimation to the UE through the handover message received from the eNB of the macrocell in step 1202. The information transmitted to the UE may include subframe configuration of the macrocell such as an ABS (or ABS to which MBSFN configuration is applied) pattern, in addition to information as to whether resource specific channel estimation is performed and whether CRS collision occurs.

As described above, in the macrocell and picocell deployment, subframe configuration information may be exchanged through an x2 interface. Therefore, after the picoUE accesses the picocell, the picoUE can recognize information about the resource specific channel estimation from the picocell of a serving cell through upper layer signaling (e.g. RRC signaling).

Meanwhile, unlike FIG. 12, when a picoUE which has accessed a picocell enters a ranging expansion region, it is proposed to receive signaling of information about resource specific channel estimation from the picocell. In this case, an eNB of the picocell has already received information about resource specific channel estimation through an x2 interface from an eNB of a macrocell, the eNB of the picocell can signal a resource region for channel estimation to the picoUE based on corresponding information.

Meanwhile, a method in which a UE performs resource specific channel estimation through judgment thereof may be considered. In other words, since an eNB of a picocell should signal a subframe capable of performing channel estimation to a picoUE within a range expansion region, the picoUE may perform channel estimation using a CRS having no interference based on subframe information designated through corresponding signaling. The subframe in which the picoUE located within the range expansion region performs channel estimation may be restricted to an ABS to which MBSFN configuration is applied.

In the case of a macrocell and femtocell deployment, which is another case where an eICIC scheme is applied in an LTE-A system, a macro UE may be subject to strong interference from the femtocell within or around the femtocell (CSG cell) to which access is not permitted. As described above, there is no information exchange through an x2 interface between the macrocell and the femtocell. Accordingly, if a UE is not permitted to access a femtocell, a reception signal intensity of which is strong, channel estimation using only a CRS of a specific resource region according to the present invention is proposed. In this case, it may be considered that the corresponding UE receives signaling of information about a femtocell, i.e. information as to whether CRS collision occurs and whether a subframe boundary is matched, after accessing a macrocell, and changes a resource region which can perform channel estimation.

In the above embodiments, although an umbrella term 'channel estimation' has been used, a more specific term such as interference measurement or reception signal intensity measurement may be applied.

It has been assumed in the above description that CRS collision between cells occurs. However, if a macrocell, which is an interfering cell in the macrocell and picocell deployment of a HetNet system, creates serious interference on a picocell which is an interfered cell and if a subframe boundary is matched, control channel reception performance may be deteriorated even though CRS collision between cells does not occur. To solve this problem, it is proposed that CRSs of corresponding cells intentionally collide with each other. This will be described in detail hereinbelow.

A downlink control channel may be broadly divided into a PCFICH, a PHICH, a PDCCH, etc. as described previously and, among these channels, the PCFICH transmitted in the first symbol of a subframe serves to indicate the number of symbols occupied by the PDCCH in one subframe. Accordingly, the PCFICH should be decoded first for decoding of the PDCCH. If decoding of the PCFICH fails, performance of a corresponding subframe may be seriously deteriorated.

Figure 13:
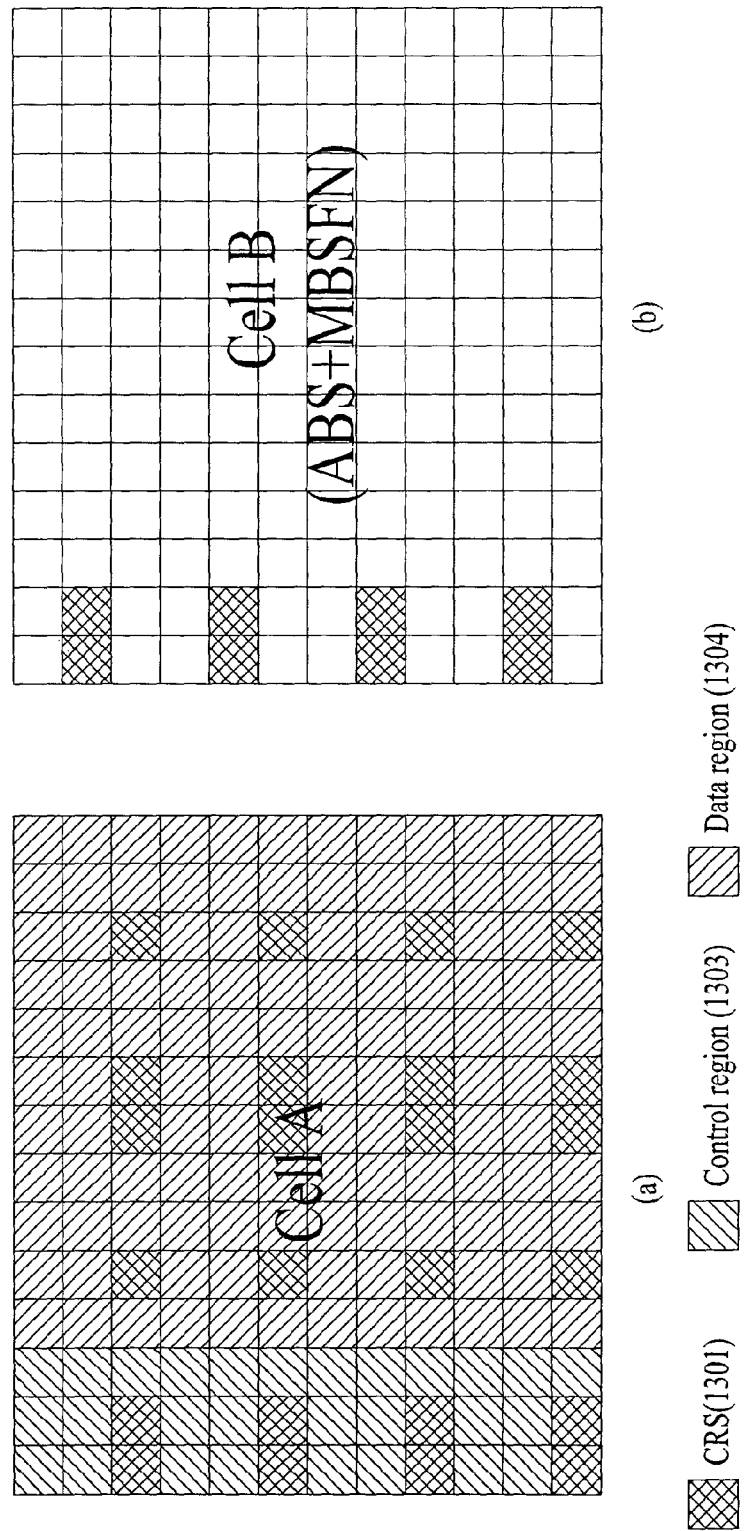
FIG. 13 is a diagram explaining a method for applying a resource specific channel estimation scheme of the present invention when CRS collision between cells does not occur.

FIG. 13 is a diagram explaining a method for applying a resource specific channel estimation scheme of the present invention when CRS collision between cells does not occur. In FIG. 13, in order for an interfered cell, a cell A, and an interfering cell, a cell B, to reduce interference through cooperation, a subframe allocated to the cell B is designated as an ABS to which MBSFN configuration is applied and CRS collision between cells does not occur by $V_{shift}$.

Referring to FIG. 13, if an ABS to which MBSFN configuration is applied is used, it is appreciated that intercell interference caused by the interfering cell of a cell B is greatly reduced. Further, since CRS collision between cells does not occur, any problem in channel estimation for almost all regions within a subframe does not occur. However, in the interfered cell of the cell A, specific resource elements of the first and second symbols may be subject to interference from CRSs of the cell B, and, in the case of a PCFICH, about 50% of resource elements among all resource elements allocated to the PCFICH are subject to interference directly from the CRSs of the cell B as described above. This means that the performance of the PCFICH cannot be ensured and entire system performance may be reduced. Although it is assumed in FIG. 13 that the number of transmission antennas is 4, the same problem may occur even when the number of transmission antennas is 2.

In the present invention, in order to protect a control channel such as PCFICH in the above circumstance, the followings are proposed: 1) to collide CRSs of an interfering cell and an interfered cell through adjustment of $V_{shift}$, 2) to designate a corresponding subframe in the interfering cell as an ABS to which MBSFN configuration is applied, and 3) to perform the aforementioned resource specific channel estimation scheme. This will be described in detail hereinbelow.

First, to collide CRSs of the interfering cell and interfered cell collide as in 1), interference generated from the CRSs of interfering cell may be restricted to the CRSs of the interference cell. Since $V_{shift}$ is based on a cell ID, a difference between cell IDs of the interfering cell and interfered cell may be adjusted to be a multiple of 3, thereby inducing CRS collision.

If a corresponding subframe in the interfering cell as an ABS to which MBSFN configuration is applied as in 2), interference generated from the CRSs of the interfering cell may be restricted to a control region of the interfered cell.

Finally, if the resource specific channel estimation scheme of the present invention is applied as in 3), the resource may be specified only to an RS within a data region to perform channel estimation.

As described above, even though CRS collision between cells does not occur, the subframe configuration shown in FIG. 13 may be set to the subframe configuration shown in FIG. 11 by applying the above proposal of 1) to 3), and in this case, more accurate channel estimation can be performed through the resource specific channel estimation scheme of the present invention.

Figure 14:
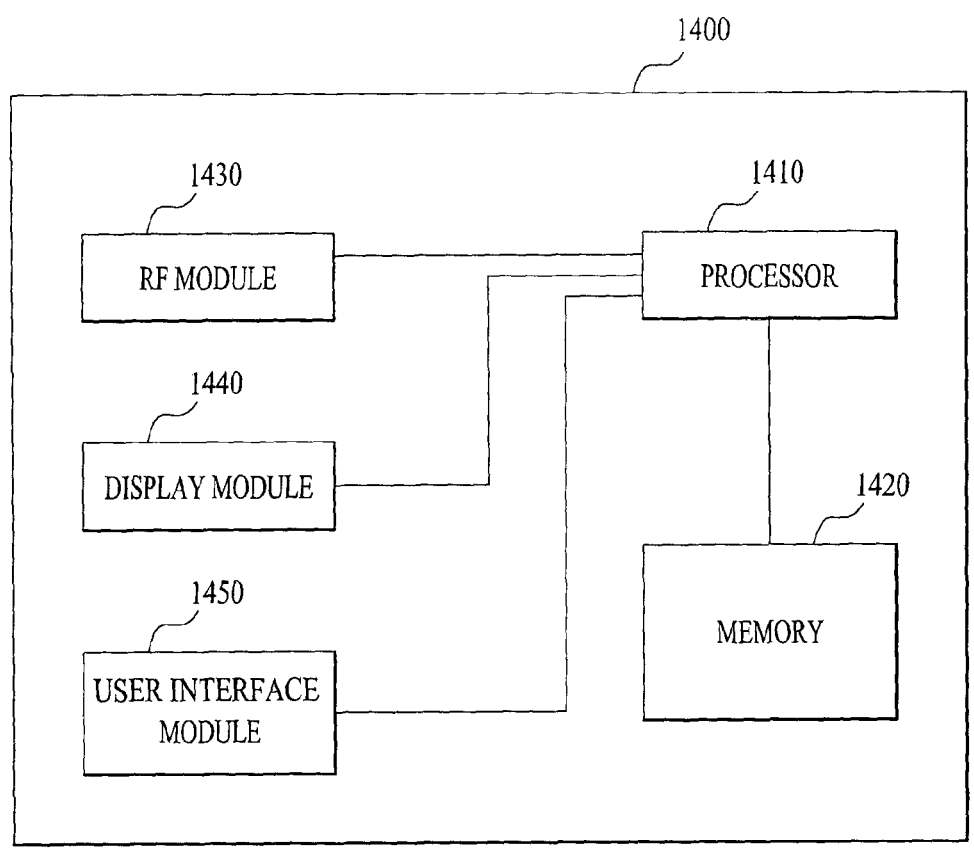
FIG. 14 is a block diagram showing the configuration of a communication device according to an exemplary embodiment of the present invention.

FIG. 14 is a block diagram showing the configuration of a communication device according to an exemplary embodiment of the present invention.

Referring to FIG. 14, a communication device 1400 includes a processor 1410, a memory 1420, an RF module 1430, a display module 1440, and a user interface module 1450.

The communication device 1400 is depicted for convenience of description and some modules may be omitted. The communication device 1400 may further include necessary modules. Some modules of the communication device 1700 may be further divided into segmented modules. The processor 1410 is configured to operate according to the exemplary embodiments of the present invention described with reference to the drawings. For a detailed operation of the processor 1410, reference may be made to a description in conjunction with FIGS. 1 to 13.

The memory 1420 is connected to the processor 1410 and stores operating systems, applications, program codes, data, and the like. The RF module 1430 is connected to the processor 1410, and converts a baseband signal into a radio signal or a radio signal into a baseband signal. To this end, the RF module 1430 performs analog conversion, amplification, filtering, and frequency up-conversion or performs the inverse of these processes. The display module 1440 is connected to the processor 1410 and displays a variety of information. The display module 1440 uses, but is not limited to, a well-known element such as a Liquid Crystal Display (LCD), a Light Emitting Diode (LED), an Organic Light Emitting Diode (OLED), or the like. The user interface module 1450 is connected to the processor 1410 and may be configured by a combination of well-known user interfaces such as a keypad, a touchscreen, etc.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description of embodiments of the present invention has been made of a data transmission and reception relationship between an RN and a BS. Here, a specific operation described as being performed by the BS may be performed by an upper node of the BS. Namely, it is apparent that, in a network comprised of a plurality of network nodes including the BS, various operations performed for communication with the UE may be performed by the eNB, or network nodes other than the BS. The BS may be replaced with the term 'fixed station', 'Node B', 'eNode B' (eNB), 'access point', etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method and apparatus for performing resource-specific channel estimation in a heterogeneous network system has been described as applied to the 3GPP LTE system, they may applied to various wireless communication systems in addition to the 3GPP LTE system.

The invention claimed is:

1. A method for performing resource specific channel estimation at a user equipment in a wireless communication system, comprising:
receiving one or more RSs in a specific subframe from a serving cell; and
performing channel estimation for a control region of a corresponding downlink subframe, based on the one or more RSs,
wherein the channel estimation for the control region is performed based on one or more reference signals included in a data region of the corresponding downlink subframe, and
wherein a difference between a cell ID of the serving cell which is an interfered cell and a cell ID of an interfering cell is a multiple of 3.

2. The method according to claim 1, further comprising:
receiving resource specific channel estimation related information from the serving cell which is an interfered cell,
wherein resource specific channel estimation related information includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed.

3. The method according to claim 1, wherein a reference signal transmitted through a control region of a downlink subframe corresponding to the serving cell which is an interfered cell and a reference signal transmitted through a control region of a downlink sub frame corresponding to an interfering cell are mapped to the same resource element.

4. The method according to claim 1, wherein a downlink sub frame corresponding to an interfering cell is configured such that only a cell-specific reference signal allocated to a control region is transmitted.

5. The method according to claim 1, wherein the serving cell which is an interfered cell is a picocell and an interfering cell is a macrocell.

6. The method according to claim 5, further comprising:
if the user equipment connected to the macrocell is located in a range expansion region, receiving a handover message to the picocell from the macro cell; and
accessing the picocell based on the handover message,
wherein the handover message includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed.

7. The method according to claim 6, wherein the information about the ABS and information about whether MBSFN configuration is applied to the ABS are transmitted to the picocell from the macrocell through an x2 interface.

8. A user equipment apparatus for performing resource specific channel estimation in a wireless communication system, comprising:
a reception module for receiving one or more reference signals in a specific subframe from a serving cell; and
a processor for performing channel estimation for a control region of a corresponding downlink subframe, based on the one or more reference signals,
wherein the channel estimation for the control region is performed based on one or more reference signals included in a data region of the corresponding downlink subframe,
wherein a difference between a cell ID of the serving cell which is an interfered cell and a cell ID of an interfering cell is a multiple of 3.

9. The user equipment apparatus according to claim 8, wherein the reception module receives resource specific channel estimation related information from the serving cell which is an interfered cell, and wherein resource specific channel estimation related information includes at least one of information about an Almost Blank Sub frame (ABS) designated by an interfering cell, information about whether Multicast Broadcast Single Frequency Network (MBSFN) configuration is applied to the ABS, and information about whether the resource specific channel estimation is performed.

10. The user equipment apparatus according to claim 8, wherein a reference signal transmitted through a control region of a downlink subframe corresponding to the serving cell which is an interfered cell and a reference signal transmitted through a control region of a downlink subframe corresponding to an interfering cell are mapped to the same resource element.

11. The user equipment apparatus according to claim 8, wherein a downlink sub frame corresponding to an interfering cell is configured such that only a cell-specific reference signal allocated to a control region is transmitted.

12. The user equipment apparatus according to claim 8, wherein the serving cell which is an interfered cell is a picocell and an interfering cell is a macrocell.

13. The user equipment apparatus according to claim 8,
wherein, if the user equipment apparatus connected to the macrocell is located in a range expansion region, the user equipment apparatus receives a handover message to the picocell from the macrocell and accesses the picocell based on the handover message, and
wherein the handover message includes at least one of information about an Almost Blank Subframe (ABS) designated by an interfering cell, information about whether Multicast Broadcast Single Frequency Network (MBSFN) configuration is applied to the ABS, and information about whether the resource specific channel estimation is performed.

14. The user equipment apparatus according to claim 13, wherein the information about the ABS and information about whether MBSFN configuration is applied to the ABS are transmitted to the picocell from the macrocell through an x2 interface.

* * * * *